United States Patent [19]

Friedman et al.

[11] Patent Number: 4,478,277
[45] Date of Patent: Oct. 23, 1984

[54] HEAT EXCHANGER HAVING UNIFORM SURFACE TEMPERATURE AND IMPROVED STRUCTURAL STRENGTH

[75] Inventors: Irwin R. Friedman, La Crosse; Harry D. Foust, Winona; Alan G. Butt, La Crosse, all of Wis.

[73] Assignee: The Trane Company, La Crosse, Wis.

[21] Appl. No.: 392,812

[22] Filed: Jun. 28, 1982

[51] Int. Cl.³ .............................................. F28F 3/02
[52] U.S. Cl. ..................................... 165/185; 165/170; 165/47; 29/157.3 R
[58] Field of Search ............... 165/166, 167, 168, 170, 165/185, 80 C, 47; 29/157.3 B, 157.3 D, 157.3 R

[56] References Cited

U.S. PATENT DOCUMENTS

| Re. 16,155 | 9/1925 | Malm | 165/170 |
| 600,227 | 3/1898 | Knispel | 165/170 |
| 2,981,520 | 4/1961 | Chadburn | 165/170 |
| 3,024,606 | 3/1962 | Adams et al. | 165/168 |
| 3,160,132 | 12/1964 | Mowatt | 165/185 |
| 3,327,776 | 6/1967 | Butt | 165/80 C |
| 4,006,776 | 2/1977 | Pfouts et al. | 165/166 |
| 4,258,784 | 3/1981 | Perry et al. | 165/166 |
| 4,301,863 | 11/1981 | Bizzarro | 29/157.3 B |

FOREIGN PATENT DOCUMENTS 2913061 10/1980 Fed. Rep. of Germany ...... 165/185

Primary Examiner—Albert W. Davis, Jr.
Attorney, Agent, or Firm—Ronald M. Anderson; Raymond W. Campbell; Carl M. Lewis

[57] ABSTRACT

A plate-type heat exchanger having uniform surface temperature and improved structural strength is disclosed, which may be used as a structural support member for an object to be temperature controlled, and which provides a surface having an exceptionally uniform temperature for either heating or cooling the object. The heat exchanger includes a fin pad and a machined plate having a fluid passage therein, as well as other structural frame and support members. The major circuit flow direction of the fluid in the passage is perpendicular to the major longitudinal fin direction of the fin pad in the preferred embodiment. All components of the heat exchanger are of material having good thermal conductivity and structural strength, and the components are brazed or otherwise secured together to provide good thermal conductivity and structural reinforcement throughout.

11 Claims, 6 Drawing Figures

HEAT EXCHANGER HAVING UNIFORM SURFACE TEMPERATURE AND IMPROVED STRUCTURAL STRENGTH

DESCRIPTION

BACKGROUND OF THE INVENTION

1. Technical Field

The present invention relates generally to the field of plate-type heat exchangers and specifically to plate-type heat exchangers which provide a cooled or heated surface on which or near which an article to be cooled or heated is placed.

2. Description of the Prior Art

Cooling or heating an object is frequently accomplished by cooling or heating the environment immediately surrounding the object. Thus, the air in a space can be cooled or heated to cool or heat objects therein. In some situations, however, it is advantageous to provide a cooled or heated surface on which the object is placed for transferring heat directly between the object and a heat exchanger. For example, in some types of equipment, such as a missile launcher, batteries providing power for the device must be cooled during use. One advantageous method for cooling the battery is to provide a heat exchanger having a cooled upper surface which will also support the battery. In addition to cooling the battery, such a so-called "cold plate" also serves as a structural support member for the battery. Hence, it is important that, in addition to providing a uniformly cooled surface, the cold plate also has sufficient structural strength to support an object which, in some situations, may weigh hundreds or thousands of pounds.

Other advantageous uses of so-called cold or hot plate heat exchangers having a uniformly cooled or heated surface and sufficient structural strength to support the objects being cooled or heated are also known. For example, such a cold plate heat exchanger could also be used advantageously as the floor or walls of a refrigerated compartment or truck trailer for transporting or storing perishable goods. Curved heat exchangers could be used as side walls of process vessels, such as reactors, fermenters, mixers and the like.

Plate-type heat exchangers known in the past do not provide uniform cooling and/or heating of a surface of the heat exchanger, nor do they provide the structural strength and supportive strength required in the aforementioned applications. U.S. Pat. No. 4,258,784 entitled, "Heat Exchange Apparatus And Method of Utilizing The Same" issued to Clifford R. Perry and Lloyd H. Deitz, discloses a plate-type heat exchanger in which serpentine passages separated by thin plastic sheets are used to transfer heat between two fluids. U.S. Pat. No. 4,006,776 entitled, "Plate Type Heat Exchanger" issued to Robert R. Pfoutz, Anson S. Coolidge, and Derold D. Peter discloses a heat exchanger in which corrugated fin pads are used to enhance heat transfer between a first fluid flowing through passages transversely disposed relative to the direction of the fins in the fin pads and a second fluid flowing through the fin pad. Neither of the patents teach combining the serpentine passages and fin pads for providing a uniformly cooled or heated surface on the heat exchanger, nor do the disclosures teach means for providing exceptional structural and supportive strength in the heat exchanger. Additionally, each teaches transferring heat between two fluids, both of which flow through the heat exchanger.

SUMMARY OF THE INVENTION

It is therefore one of the principal objects of the present invention to provide a plate-type heat exchanger in which a hot or cold fluid may be passed through the heat exchanger to provide uniform heating or cooling of a surface of the heat exchanger, to heat or cool an object adjacent the mentioned surface.

Another of the principal objects of the present invention is to provide a plate-type heat exchanger which can be used as a structural or supportive member in a system or device using the heat exchanger.

Still another object of the present invention is to provide a plate-type heat exchanger in which the arrangement of components therein results in each component functioning in one or more heat conductive paths to provide a uniform surface temperature on the heat exchanger, and in which each component thereof is arranged relative to the other components thereof to improve structural and supportive strength in the heat exchanger.

A still further object of the present invention is to provide a heat exchanger which can be manufactured relatively simply with known manufacturing techniques, which is lightweight and which will support articles weighing greatly in excess of the weight of the heat ex- changer.

These and other objects are achieved in the present invention by providing a plate-type heat exchanger having a variety of components, each comprised of material having excellent thermal conductivity and strength to weight ratio characteristics, which components are soarranged as to provide improved thermal conductivity through the heat exchanger, and to provide structural strength in the heat exchanger. The heat exchanger includes a fin pad sandwiched between a bottom plate member and a separator sheet, with a frame of barlike, strong, supportive members surrounding the fin pad and also being sandwiched between the bottom plate member and the separator sheet. A machined plate having a serpentine fluid passage therein is disposed on top of the separator sheet, and a top plate is disposed on top of the machined plate, the top plate having an upper surface which will be uniformly heated or cooled by fluid flowing through the passage. The major flow direction of the serpentine fluid passage is perpendicular to the longitudinal fin direction of the fin pad in the preferred embodiment of the invention. Thus, heat transfer is conducted laterally by the serpentine passage and longitudinally by the fin pad throughout the heat exchanger. Continuous, intimate cohesion, such as by vacuum brazing, is provided between adjacent mating surfaces of all components, and each component functions in one or more heat conducting paths for transferring heat between a fluid flowing through the serpentine passages and the upper surface of the top plate. The components so-arranged provide exceptional structural strength both supportive and torsional.

Further objects and advantages of the present invention will become apparent from the following detailed description and the accompanying drawings.

DETAILED DESCRIPTION OF THE PREFERRED EMBODIMENT

Figure 1:
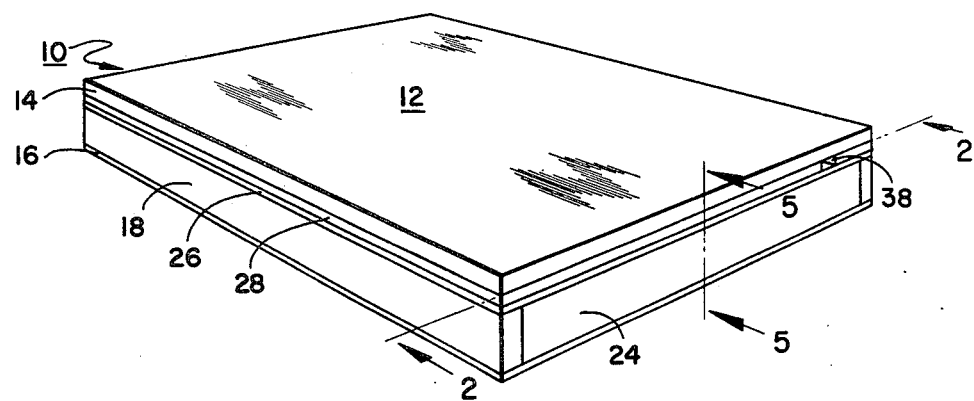
FIG. 1 is a perspective view of a heat exchanger embodying the present invention.

Referring now more specifically to the drawings, and to FIG. 1 in particular, numeral 10 designates a heat exchanger embodying the present invention, having an upper surface 12 which has a substantially uniform temperature thereover during operation of the heat exchanger to heat or cool an object placed on, or adjacent the surface. Although surface 12 has been described as an "upper" surface this, as well as references to "top", "bottom" or the like, is used only for the sake of clarity in describing the invention as shown in the drawings. In actual use the heat exchanger can be inverted from that position shown in FIG. 1, it can be placed on its side, or it can be angularly disposed. Thus, as used herein, including the claims, the aforementioned words should be understood to differentiate between various components and not to limit the orientation thereof. Each of the components of the heat exchanger to be described hereinafter is preferably made of material having both high heat transfer and high strength to weight characteristics. These are felt to be important in the present heat exchanger in that each component of the heat exchanger serves to increase the structural strength of the heat exchanger, and enters into one or more heat conductive paths for providing a uniform temperature across surface 12. Aluminum possesses these characteristics and has been found to be a particularly advantageous material for heat exchangers embodying the present invention, particularly because well-known fabricating techniques, such as vacuum brazing, can be used to provide intimate contact and cohesion between all adjacent mating surfaces, thereby increasing heat transfer and strength of the heat exchanger.

Figure 3:
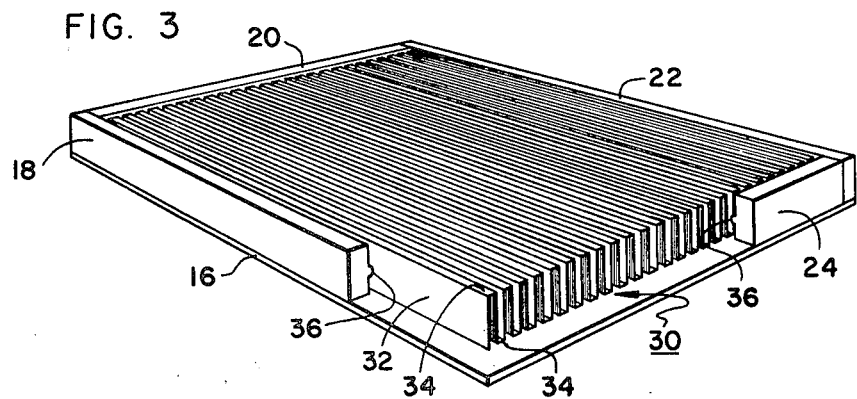
FIG. 3 is a perspectively shown cross-sectional view, partially broken-away, of the heat exchanger shown in the preceding Figures, taken on line 3—3 of FIG. 2.

Heat exchanger 10 includes a top plate 14 and a bottom plate 16 of substantially equal length and width, and disposed in parallel, spaced relation to each other. For best heat transfer effectiveness, the top plate is thicker than the bottom plate, being about two times as thick as the bottom plate in the preferred embodiment. A frame including frame members 18, 20, 22, and 24 is disposed between the top and bottom plates at and near the outer edges thereof. The frame members are bar-like pieces intimately joined to the bottom plate along their entire lengths, and to each other at the adjoining surfaces near the corners of the heat exchanger. The frame members support a generally sandwiched-type arrangement on the top thereof consisting of a separator sheet 26, a machined plate 28 and the aforementioned top plate 14. The separator sheet, machined plate and top plate are intimately joined together, and the separator sheet is intimately joined to the top of the frame members, to define and protect a chamber having the separator sheet, bottom plate, and frame members as top, bottom and sides, respectively. A fin pad 30 is disposed within the chamber, and the fin pad is joined to bottom plate 16 and separator sheet 26. The fin pad is a corrugated structure, which can be seen most clearly in FIG. 3, and includes vertical walls 32 and horizontal ridges 34. The fin pad substantially fills the chamber between the frame members, and the frame members may include projections 36 which extend inwardly from the frame members to cause intimate contact between the frame members and the fin pad. For reference purposes hereinafter, the major longitudinal fin direction of fin pad 30 should be understood to mean that direction in which the horizontal and vertical surfaces have their longest extent, i.e., the longitudinal direction between frame members 20 and 24 in the structure shown.

Figure 2:
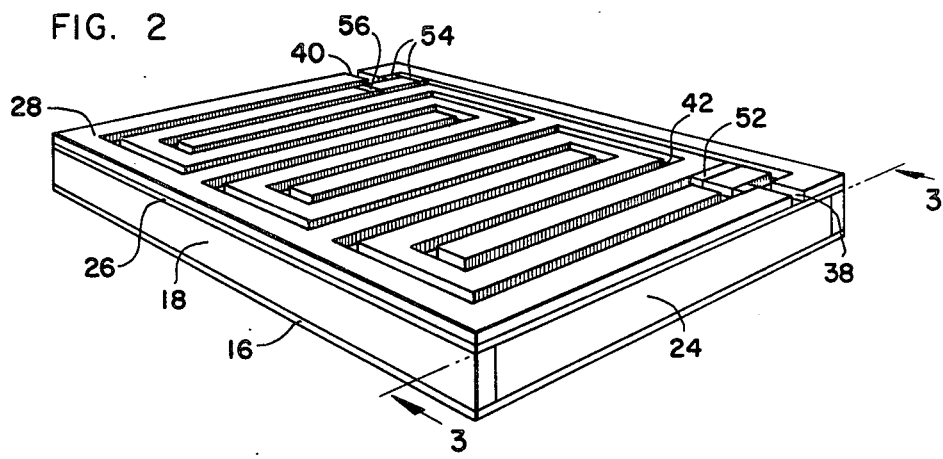
FIG. 2 is a perspectively shown cross-sectional view of the heat exchanger shown in FIG. 1, taken on line 2—2 of the latter Figure.
Figure 4:
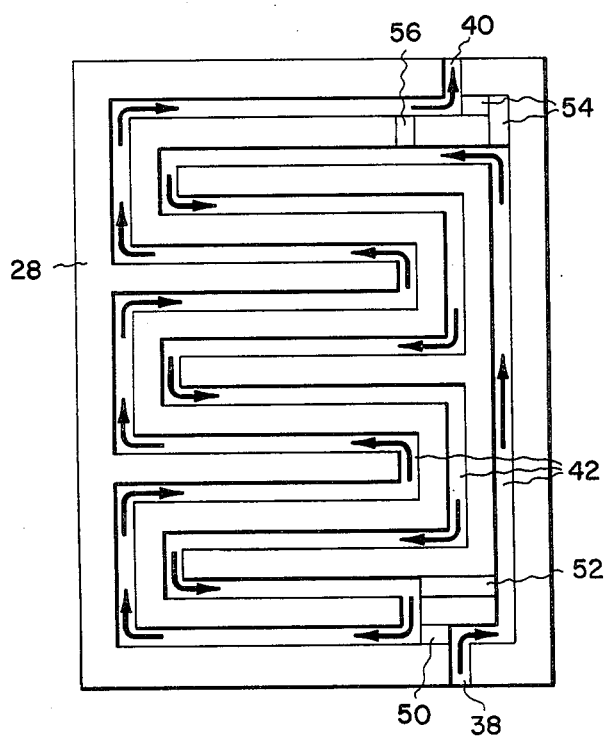
FIG. 4 is a top plan view of the heat exchanger as shown in FIG. 2.
Figure 5:
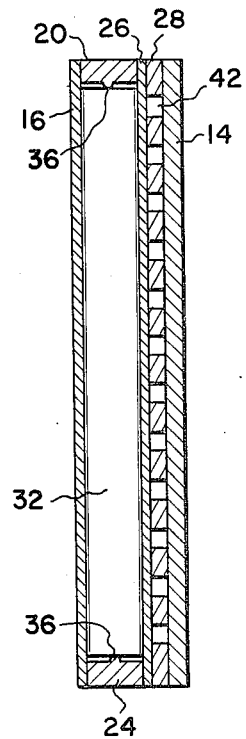
FIG. 5 is a cross-sectional view of the heat exchanger shown in the preceding Figures, taken on line 5—5 of FIG. 1.

Separator sheet 26 is disposed above the fin pad 30 and is supported by frame members 18, 20, 22, and 24. The separator sheet, along with the frame members and bottom plate, protects the fin pad from mechanical damage in addition to providing strength to the heat exchanger and entering into one or more heat conductive paths within the heat exchanger. The separator sheet is substantially the same length and width as the top and bottom plates, and is joined on its upper surface to the machined plate 28, which includes an inlet opening 38 to and an outlet opening 40 from a fluid flow path comprising a channel indicated generally by numeral 42. The fluid flow path may be of many different configurations such as serpentine or double-serpentine, and the size of the channel is selected to achieve the desired flow volume of fluid through the heat exchanger. Fluid flow paths having a multitude of streams can be used to evenly distribute the fluid and temperature; however, from a reliability monitoring aspect the single stream paths are preferred. Any blockage in the flow path is more easily detected in monitoring a single stream rather than multiple streams. In applications wherein exceptionally uniform and consistent surface temperatures are required, the accurate monitoring of fluid flow becomes important. A double-serpentine path as shown in FIGS. 2 and 4 can be used to provide more even heat distribution by the fluid flowing within the heat exchanger and the stream can be monitored for blockage. FIG. 4 includes arrows indicating the path of fluid flow through the heat exchanger. For reference purposes hereinafter, the major circuit flow direction should be understood to mean that general direction in which fluid flows the most, i.e., the lateral direction between frame members 18 and 22 in the structure shown.

Top plate 14 is joined to the top of machined plate 28 in the assembled heat exchanger and, with separator sheet 26, serves to confine the fluid within the fluid flow path of the channel in machined plate 28. Thus, a pressure vessel for the flow of fluid through the heat exchanger is formed by top plate 14, separator sheet 26 and the side walls of the channel formed in machined plate 28. The separator sheet further acts as a mating surface for the top of the corrugated fin pad and as a heat-transfer conduit between the fin pad and the fluid flowing through machined plate 28.

PREFERRED METHOD OF MANUFACTURE

The fluid flow path in machined plate 28 may be formed by milling or punching the channel in the plate. For efficiently accomplishing this, the fluid flow path shown in FIGS. 2 and 4 has been designed to be symmetrical about the mid-line of the plate extending generally in the direction of the major circuit flow direction. The symmetric channel is punched in the plate, and inserts 50, 52, 54, and 56 are disposed in various portions of the channel, as indicated, to block fluid flow, causing the double-serpentine path as shown. If the inserts are sopositioned with suitable brazing alloy provided, the channel will be effectively blocked in these areas to form the double-serpentine path.

In assembling the machined plate relative to the fin pad, the major circuit flow direction is perpendicular to the major longitudinal fin direction. Thus, as described previously, the fins extend generally between frame members 20 and 24 and the major flow direction of a fluid through the heat exchanger is serpentined generally between the sides of the frame members 18 and 22. The perpendicular relationship between the fin pad direction and the direction of fluid flow provides a more consistent temperature transfer to top plate 14 and upper surface 12 thereof than do other directional relationships, however, other angular relationships can be used. For example, if the direction of the fin pad is disposed at 85° from the flow direction, heat transfer will be nearly as effective as for the 90° relationship, and even a 45° relationship provides some heat transfer benefit. For any angular relationship between 45° and 90° the primary angular directions of heat distribution by the fin pad and fluid circuit are perpendicular, and the secondary non-perpendicular angular component is least significant in the relationships nearest 90°.

The above-described heat exchanger is particularly suitable for manufacturing by vaccum brazing or the like. The aforedescribed components, including the top and bottom plates, the frame members, fin pad, separator sheet, and machined plate with inserts are assembled with interspacing by brazing alloy between all mating surfaces. The alloy may be a foil or may be clad on the components, and the composite structure is then fixtured and brazed in a vacuum brazing furance by well-known techniques. Such manufacturing procedure provides a structure having continuous and intimate contact and cohesion between all members, for both efficient heat transfer among the components and improved structural strength for the overall assembly.

OPERATION

In the use and operation of a heat exchanger embodying the present invention, inlet and outlet pipes are connected, respectively, to inlet 38 and outlet 40 of the channel 42 defining the fluid flow path through the heat exchanger. An object to be temperature controlled, such as a perishable good, a battery to be cooled or the like may be placed on surface 12 of top plate 14. The double-serpentine path provides a relatively uniform heat transfer between the fluid and top plate 14 in the major circuit flow direction, and the corrugated fin pad tends to distribute heat more efficiently in the major longitudinal fin direction. Thus, heat is conducted both laterally and longitudinally in the heat exchanger, and the perpendicular relationship between the fluid flow path and the major longitudinal direction of the fin pad in the preferred embodiment provides exceptionally uniform temperature on surface 12 of plate 14. Each of the components of the heat exchanger further assists in the heat transfer through numerous heat conductive paths, to provide a uniform temperature across the surface of the heat exchanger. By way of example, several of the heat conductive paths are summarized below. It should be understood that other different paths of heat transfer exist in the heat exchanger, and the following list is not meant to be exhaustive.

1. Heat may be transferred directly between the fluid flowing through channel 42 in machined plate 28 and the top plate 14.
2. Heat may be transferred between the fluid, machined plate 28 and top plate 14.
3. Heat may be transferred between the fluid, separator sheet 26, machined plate 28 and top plate 14.
4. Heat may be transferred between the fluid, separator sheet 26, fin pad 30, separator sheet 26, machined plate 28 and top plate 14.
5. Heat may be transferred between the fluid, separator sheet 26, fin pad 30, bottom plate 16, fin pad 30, separator sheet 26, machined plate 28 and top plate 14; and
6. Heat may be transferred between the fluid, separator sheet 26, fin pad 30, bottom plate 15, any of the frame members 18, 20, 22, or 24, separator sheet 26, machined plate 28 and top plate 14.

Thus, it is clearly evident that all components of the structure enter into one or more heat conductive paths for even distribution of heat, and a uniform temperature is provided across the upper surface 12 of top plate 14. The heat flow paths can be adjusted for maximum heat transfer efficiency at minimal heat exchanger weights. Thus, the thicknesses of the top plate, machined plate, separator sheet and bottom plate can be adjusted as a function of the volume of fluid flowing through the passage and the heat transfer effectiveness of the fluid and fin pad to best achieve the required temperature uniformity on surface 12.

The channel forming the fluid passageway in the machined plate may be serpentine or compound serpentine as shown; however, other arrangements are also useful, such as parallel flow. The primary object in designing the fluid flow passage and the fin pad is to have the major fluid circuit flow path in the fluid passageway, and therefore the major temperature distribution direction by the fluid at 90° relative to the primary direction of heat distribution of the fin pad, to achieve uniform heat conduction both longitudinally and laterally in the heat exchanger. For this, the perpendicular relationship between the fin pad and fluid circuit is preferred; however, any angular relationship in which the primary heat conductive directions are perpendicular is useful.

A heat exchanger embodying the present invention can be used as a structural support element in an assembly which includes the heat exchanger. Each of the components of the heat exchanger, in addition to functioning in one or more heat conductive paths within the heat exchanger, also functions to structurally strengthen the heat exchanger. For example, the top and bottom plates, frame members, machined plate and separator sheet in the brazed, sandwichedtype arrangement provide good structural strength. The fin pad acts as the web of an "I" beam, with the top plate, machined plate and separator sheet acting as the top flange of the "I" beam and the bottom plate acting as the bottom flange. Each of the vertical walls 32 of the fin pad acts as a tiny "I" beam with the adjacent horizontal walls 34. Thus, the heat exchanger has excellent bearing strength both in compression and tension and can act as a beam in the longitudinal direction of the fin pad. In the lateral direction of the heat exchanger, i.e., the direction perpendicular to the major longitudinal fin direction, the heat exchanger is less rigid than it is in the longitudinal direction, and the heat exchanger may be bent or otherwise shaped to form a curve necessary for use in a curved vessel or the like.

Figure 6:
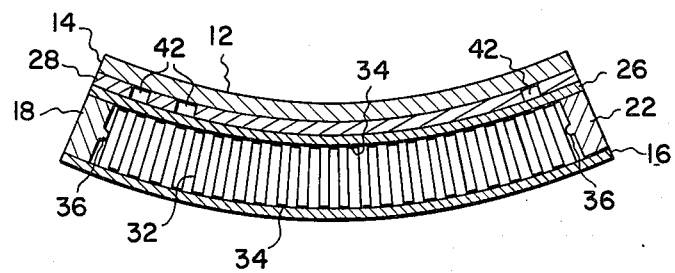
FIG. 6 is a lateral cross-sectional view of a modified form of the invention.

FIG. 6 shows a curved heat exchanger embodying the present invention, the structure of which is similar to that described for a flat heat exchanger. Like numerals represent the similar, but curved components of the curved heat exchanger with respect to the flat heat exchanger.

Although one structure of a heat exchanger embodying the present invention has been shown and described in detail herein, various changes may be made without departing from the scope of the present invention.

We claim:

1. A heat exchanger comprising a top plate and a bottom plate disposed in substantially parallel spaced relation, said plates being of substantially equal length and width dimensions; one of said plates having an outer surface the temperature of which is controlled for substantial uniformity thereover by a fluid flowing through said heat exchanger, said one plate being adapted for disposition adjacent an object to be temperature controlled for transferring heat between the object and said fluid flowing through the heat exchanger, a frame disposed between said plates near the peripheries thereof, said frame including frame members affixed to said bottom plate and extending upwardly therefrom to define a chamber; a fin pad disposed within said chamber, said fin pad being a generally corrugated structure closed to fluid flow and having ridges disposed along the major longitudinal fin direction of said fin pad adapted for transferring heat primarily in a first direction in the heat exchanger, said fin pad being in contact with said bottom plate and with a plate disposed above said chamber and supported by said members, said fin pad being supportive of said plates defining said chamber; fluid flow means disposed between said top plate and said fin pad for providing a confined path for fluid to flow through said heat exchanger, said path having a major circuit flow direction transferring heat primarily in a second direction in said heat exchanger, said first and second directions of primary heat transfer being in mutual perpendicular relation; and inlet and outlet openings in said fluid flow means.

2. A heat exchanger as defined in claim 1 in which said major longitudinal fin direction is perpendicular to said major circuit flow direction.

3. A heat exchanger as defined in claim 1 or 2 in which said fluid flow means includes a separator sheet disposed above said fin pad and supported by and attached to said frame members; and a machined plate including a channel defining said path disposed on and attached to said separator sheet; and said top plate is disposed on and attached to the top of said machined plate.

4. A heat exchanger as defined in claim 3 in which said plates and said fluid flow means are substantially flat and of substantially equal length and width dimensions.

5. A heat exchanger as defined in claim 4 in which said path is double serpentined.

6. A heat exchanger as defined in claim 4 in which said plates, fluid flow means, fin pad and frame members are aluminum.

7. A heat exchanger as defined in claim 4 in which all adjacent mating surfaces of said plates, frame members, fin pad and fluid flow means are intimately and continuously cohered.

8. A heat exchanger as defined in claim 3 in which said plates, separator sheet and fin pad are curved in the direction perpendicular to said major longitudinal fin direction.

9. A heat exchanger as defined in claim 8 in which said path is double serpentined.

10. A heat exchanger as defined in claim 8 in which said plates, fluid flow means, fin pad and frame members are aluminum.

11. A heat exchanger as defined in claim 8 in which all mating surfaces of said plates, frame members, fin pad and fluid flow means are intimately and continously cohered.

* * * * *